US010683067B2

(12) United States Patent
Suresh et al.

(10) Patent No.: US 10,683,067 B2
(45) Date of Patent: Jun. 16, 2020

(54) SENSOR SYSTEM FOR MARITIME VESSELS

(71) Applicant: Buffalo Automation Group Inc., Amherst, NY (US)

(72) Inventors: Thiru Vikram Suresh, Amherst, NY (US); Alexander Zhitelzeyf, Brooklyn, NY (US); Mohit Arvind Khakharia, Amherst, NY (US); Miguel Ojielong Chang Lee, Amherst, NY (US); Troy Kilian, Buffalo, NY (US); Brian Huang, Amherst, NY (US); Trevor McDonough, Amherst, NY (US)

(73) Assignee: Buffalo Automation Group Inc., Amherst, NY (US)

( * ) Notice: Subject to any disclaimer, the term of this patent is extended or adjusted under 35 U.S.C. 154(b) by 0 days.

(21) Appl. No.: 16/536,899

(22) Filed: Aug. 9, 2019

(65) Prior Publication Data

US 2020/0047861 A1  Feb. 13, 2020

Related U.S. Application Data

(60) Provisional application No. 62/717,737, filed on Aug. 10, 2018, provisional application No. 62/725,111, filed on Aug. 30, 2018.

(51) Int. Cl.
*B63B 49/00* (2006.01)
*G01S 13/86* (2006.01)
(Continued)

(52) U.S. Cl.
CPC .......... *B63B 49/00* (2013.01); *G01C 21/203* (2013.01); *G01S 13/867* (2013.01); *G01S 13/937* (2020.01); *G01S 13/865* (2013.01)

(58) Field of Classification Search
CPC ..... B63B 49/00; G01C 21/203; G01S 13/865; G01S 13/867; G01S 13/9307
See application file for complete search history.

(56) References Cited

U.S. PATENT DOCUMENTS 5,931,110 A * 8/1999 Yamamoto .............. B63B 49/00
114/144 C
7,035,166 B2  4/2006 Zimmerman et al.
(Continued)

FOREIGN PATENT DOCUMENTS

JP  2001272248 A  10/2001
WO  2013181631 A2  12/2013
(Continued)

OTHER PUBLICATIONS

Jarvis, Ray, "Tele-autonomous watercraft navigation", Experimental Robotics, Jan. 25, 2002, VII, pp. 543-550, Springer, Berlin, Heidelberg.
(Continued)

*Primary Examiner* — Anshul Sood
(74) *Attorney, Agent, or Firm* — Hodgson Russ LLP

(57) ABSTRACT

The present disclosure provides a sensor system and method of operating the same. The sensor system includes a data collection mast including a base, a support member, a main member, a top plate, a first enclosure, a second enclosure, a first cantilever member, and a second cantilever member. The sensor system further includes a pair of stereoscopic cameras disposed on the main member extending through the second enclosure, a radar system disposed on the top plate, a compass disposed on the second cantilever member, a LIDAR unit disposed on the first cantilever member, and a control unit disposed on the main member within the first enclosure. Each of the pair of stereoscopic cameras, radar system, compass, and LIDAR unit are in electronic com-
(Continued)

munication with the control unit, such that control unit receive the data collected from each sensor.

20 Claims, 10 Drawing Sheets

(51) Int. Cl.
*G01C 21/20* (2006.01)
*G01S 13/937* (2020.01)

(56) References Cited

U.S. PATENT DOCUMENTS

| | | | |
|---|---|---|---|
| 7,127,348 | B2 | 10/2006 | Smitherman et al. |
| 7,386,226 | B2 | 6/2008 | Miyoshi et al. |
| 8,049,658 | B1 | 11/2011 | Lagonik et al. |
| 8,350,894 | B2 | 1/2013 | Turner et al. |
| 8,639,426 | B2 | 1/2014 | Dedes et al. |
| 9,031,809 | B1 | 5/2015 | Kumar et al. |
| 9,066,085 | B2 | 6/2015 | Cluff et al. |
| 9,164,511 | B1 | 10/2015 | Ferguson et al. |
| 9,454,816 | B2 | 9/2016 | Mian et al. |
| 9,664,789 | B2 | 5/2017 | Rosenblum et al. |
| 9,739,881 | B1 | 8/2017 | Pavek et al. |
| 9,877,009 | B2 | 1/2018 | Tran et al. |
| 2001/0048763 | A1 | 12/2001 | Takatsuka et al. |
| 2009/0292468 | A1 | 11/2009 | Wu et al. |
| 2010/0066587 | A1 | 3/2010 | Yamauchi et al. |
| 2016/0214534 | A1* | 7/2016 | Richards ............. H04N 5/332 |
| 2018/0020651 | A1* | 1/2018 | Larkin ................. A01K 97/10 43/21.2 |
| 2018/0052457 | A1 | 2/2018 | Kim et al. |
| 2018/0164434 | A1* | 6/2018 | Stokes ................. G01S 7/6218 |
| 2018/0165870 | A1* | 6/2018 | Stokes ................. G06T 11/20 |
| 2018/0216958 | A1 | 8/2018 | Park |
| 2018/0372875 | A1* | 12/2018 | Juelsgaard ........... G01S 17/936 |

FOREIGN PATENT DOCUMENTS

| | | |
|---|---|---|
| WO | 2017136014 A2 | 8/2017 |
| WO | 2017167902 A1 | 10/2017 |
| WO | 2018086133 A1 | 5/2018 |

OTHER PUBLICATIONS

Sun, Yu, Oct. 6, 2016, "Sensors on AV", retrieved from http://oview.xintech.org/2016/10/06/sensors-on-av/.

Baranski et al., "Enhancing positioning accuracy in urban terrain by fusing data from a GPS receiver, inertial sensors, stereo-camera and digital maps for pedestrian navigation", Sensors, May 25, 2012, issue 12(6), pp. 6764-6801.

Choi et al., "Design of Multi-Sensor-Based Open Architecture Integrated Navigation System for Localization of UGV", Journal of Positioning, Navigation, and Timing, Jan. 1, 2012, issue 1(1), pp. 35-43.

Simrad, "Marine electronics for powerboats and sportfishing", Jan. 1, 2017, retrieved from http://ww2.simrad-yachting.com/Root/Catalogs/SimradYachting/2017/simrad2017_Catalog_Final.pdf.

Sport Fishing, "Top electronics technology for your midsize to large center console", Apr. 30, 2018, retrieved from https://www.sportfishingmag.com/top-electronics-technology-for-your-midisze-to-large-center-console/.

Prasad et al., "Video processing from electro-optical sensors for object detection and tracking in a maritime environment: a survey", IEEE Transactions on Intelligent Transportation Systems, Aug. 1, 2017, vol. 18, Issue No. 8, pp. 1993-2016.

Mou et al., "Wide-baseline stereo-based obstacle mapping for unmanned surface vehicles.", Sensors, May 3, 2018, vol. 18, Issue No. 4, pp. 1085.

Muller et al., "Survey on ranging sensors and cooperative techniques for relative positioning of vehicles.", Sensors, Jan. 30, 2017, vol. 17, Issue No. 2, pp. 271.

Nomura et al., "A feasibility study of accurate 3D measurement of ships using dense stereo vision system.", Techno-Ocean, Apr. 3, 2017, IEEE, pp. 562-565.

Bergamasco et al., "Multi-view horizon-driven sea plane estimation for stereo wave imaging on moving vessels.", Computers & geosciences, Oct. 1, 2016, 95, pp. 105-117.

Hussein et al., "Autonomous off-road navigation using stereo-vision and laser-rangefinder fusion for outdoor obstacles detection.", IEEE Intelligent Vehicles Symposium (IV), Aug. 8, 2016, IEEE, pp. 104-109.

* cited by examiner

3000

```
┌─────────────────────────────────────────────────────────┐  3100
│           Providing a data collection mast              │
└─────────────────────────────────────────────────────────┘
                            ↓
┌─────────────────────────────────────────────────────────┐  3200
│ Collecting environmental image data with a pair of       │
│ stereoscopic cameras disposed on the data collection mast│
└─────────────────────────────────────────────────────────┘
                            ↓
┌─────────────────────────────────────────────────────────┐  3300
│ Collecting environmental radar data with a radar system  │
│ disposed on the data collection mast                     │
└─────────────────────────────────────────────────────────┘
                            ↓
┌─────────────────────────────────────────────────────────┐  3400
│ Collecting orientation data with compass disposed on the │
│ data collection mast                                     │
└─────────────────────────────────────────────────────────┘
                            ↓
┌─────────────────────────────────────────────────────────┐  3500
│ Collecting 3-D image data with a LIDAR unit disposed on  │
│ the data collection mast                                 │
└─────────────────────────────────────────────────────────┘
                            ↓
┌─────────────────────────────────────────────────────────┐  3600
│ Transmitting the environmental image data, the           │
│ environmental radar data, orientation data, and 3-D      │
│ image data to a control unit                             │
└─────────────────────────────────────────────────────────┘
                            ↓
┌─────────────────────────────────────────────────────────┐  3700
│ Operating, via the control unit, a maritime vessel       │
│ according to the environmental image data, the           │
│ environmental radar data, orientation data, and 3-D      │
│ image data                                               │
└─────────────────────────────────────────────────────────┘
```

Figure 7

SENSOR SYSTEM FOR MARITIME VESSELS

CROSS-REFERENCE TO RELATED APPLICATIONS

This application claims priority to the provisional patent application filed Aug. 10, 2018 and assigned U.S. App. No. 62/717,737, and the provisional patent application filed Aug. 30, 2018 and assigned U.S. App. No. 62/725,111, the disclosures of which are hereby incorporated by reference.

FIELD OF THE DISCLOSURE

This disclosure relates to sensory systems and, more particularly, to a sensor system for autonomous navigation of a maritime vessel.

BACKGROUND OF THE DISCLOSURE

Each year, recreational boating accidents cause hundreds of fatalities and thousands of injuries nationwide, according to U.S. Coast Guard data. These are vessels are often big enough for a family to spend anywhere from a few days to a few weeks on the water, but are too small to hire a crew, or even a junior captain. These circumstances require a captain to keep constant vigil over the boat, raising the likelihood of human error due to fatigue, distraction, or attention lapses.

Human error frequently leads to maritime accidents both at sea and near ports even with an experienced captain and crew. For example, when the Costa Concordia hit a rock near Tuscany, Italy, and dipped into the Mediterranean in 2012, people around the world wondered how the captain of a cruise ship carrying 4,229 people could have made such a simple yet fatal miscalculation. Altogether, 32 passengers died. Early on 17 Jun. 2017, the United States Navy destroyer USS Fitzgerald collided with MV ACX Crystal, a Philippine-flagged container ship, about 10 nautical miles (19 km; 12 mi) southeast of the city of Shimoda on the Japanese mainland (Honshu). The accident killed seven Fitzgerald sailors.

Similar to airplanes, many vessels have an autopilot option. These systems typically rely on GPS or similar satellite-based localization systems, a digital compass, and a digital nautical chart to navigate. Such systems have no way of detecting any vessels, debris or other dynamic nautical features that are not marked on their nautical charts. In other words, they lack both the hardware and the software to build a real-time map of their surroundings. These systems also are reactive, meaning that they respond only after the boat senses a change in tide, wind, heading, or other conditions. This is similar to cruise control on an automobile. They do not predict the trajectory of other nautical objects in their vicinity and execute preemptive maneuvers to avoid a collision.

Predictive, rather than reactive, self-driving boat technology has been used by militaries in the United States and abroad. The Pentagon has recently unveiled a self-driving 132-foot ship, the Sea Hunter, which is able to travel up to 10,000 nautical miles on its own, searching for underwater mines and submarines. BAE Systems recently tested a self-driving boat technology that can be fitted to smaller Rigid Inflatable Boats. The Royal British Navy is already employing similar technology. However, self-driving boat technology requires real-time, accurate data regarding the boat's position, orientation, and environment to generate safe and efficient navigation paths.

Accordingly, there is a long-felt need for a sensor system capable of collecting and processing real-time data for use in predictive navigational systems for self-driving maritime vessels.

BRIEF SUMMARY OF THE DISCLOSURE

An embodiment of the present disclosure provides a sensor system, comprising: a data collection mast, a pair of stereoscopic cameras, a radar system, a compass, a LIDAR unit, and a control unit.

The data collection mast may comprise a base. The data collection mast may further comprise a support member fixedly secured to the base and defining an axial through bore therein. The data collection mast may further comprise a main member having a first end fixedly secured within the through bore of the support member and a second end opposite the first end. The main member may further include a lower portion, an intermediate portion, and an upper portion sequentially located between the first end and the second end. The data collection mast may further comprise a top plate fixedly secured to the second end of the main member.

The data collection mast may further comprise a first enclosure fixedly secured to and surrounding the lower portion of the main member. The data collection mast may further comprise a second enclosure fixedly secured to and surrounding the intermediate portion of the main member.

The data collection mast may further comprise a first cantilever member having a first end and a second end, the first end fixedly secured to the intermediate portion of the main member, and the second end located at a position radially beyond the second enclosure from the main member, such that the first cantilever member is perpendicular to the main member. The data collection mast may further comprise a second cantilever member having a first end and a second end, the first end fixedly secured to the upper portion of the main member, and the second end at a position radially outward from the main member and axially above the top plate.

The pair of stereoscopic cameras may be disposed on the intermediate portion of the main member, wherein the second enclosure defines a pair of apertures, and the pair of stereoscopic cameras align with the pair of apertures. The radar system may be disposed on the top plate. The compass may be disposed on the second end of the second cantilever member. The LIDAR unit may be disposed on the second end of the first cantilever member. The control unit may be disposed on the lower portion of the main member and located within the first enclosure. The control unit may be in electronic communication with the pair of stereoscopic cameras, the radar system, the compass, and the LIDAR unit.

The data collection mast may further comprise a third cantilever member having a first end and a second end, the first end fixedly secured to the upper portion of the main member, and the second end at a position radially outward from the main member and axially above the first end of the third cantilever member, such that the third cantilever member has an elbow shape. The sensor system may further comprise a thermal camera disposed on the second end of the third cantilever member, and wherein the thermal camera is in electronic communication with the control unit.

The data collection mast may further comprise a fourth cantilever member having a first end and a second end, the first end fixedly secured to the second cantilever member, and the second end at a position radially beyond the second cantilever member from the main member and axially above the second end of the second cantilever member. The sensor system may further comprises an ultrasonic weather monitor disposed on the second end of the fourth cantilever member, and wherein the ultrasonic weather monitor is in electronic communication with the control unit.

The support member of the data collection mast may further includes one or more gusset members. Each gusset member may have a first edge and a second edge perpendicular to the first edge, wherein the first edge is fixedly secured to the base and the second edge is fixedly secured to a radial face of the support member.

The main member of the data collection mast may be hollow. Each of the cantilever members of the data collection mast may be hollow.

The sensor system may further comprise one or more additional cameras in electronic communication with the control unit. The additional cameras may be positioned at an angle relative to the pair of stereoscopic cameras. The angle relative to the pair of stereoscopic cameras may be 30 degrees.

The control unit of the sensor system may comprise one or more of a computer, a touchscreen monitor, and a mobile hotspot.

The sensor system may further comprise a mounting assembly. The mounting assembly may comprise a mounting member fixedly secured to the second end of the first cantilever member and defining a hole therein. The mounting assembly may further comprise a motor fixedly secured to the mounting member. The motor may be in electronic communication with the control unit and configured to drive an axle. The axle may be positioned through the hole of the mounting member. The mounting assembly may further comprise a carriage comprising a planar member and a flange member perpendicular to the planar member. The flange member may be fixedly secured to the axle such that the motor is configured to rotate the carriage. The LIDAR unit may be fixedly secured to the planar member of the carriage. The motor may be configured to rotate the carriage according to a cycle of 180 degrees in a first direction followed by 180 degrees in a second and opposite direction.

An embodiment of the present disclosure provides a maritime vessel that includes one or more sensor systems. The maritime vessel may include two of the sensors systems. The sensor systems may be electronically connected via a single control unit. One of the sensor systems may be mounted to the bow of the maritime vessel and another of the sensor systems may be mounted to the stern of the maritime vessel. The maritime vessel may be a speed boat or a cargo vessel.

An embodiment of the present disclosure provides a method for operating a sensor system. The method comprises providing a data collection mast.

The data collection mast may comprise a base. The data collection mast may further comprise a support member fixedly secured to the base and defining an axial through bore therein. The data collection mast may further comprise a main member having a first end fixedly secured within the through bore of the support member and a second end opposite the first end. The main member may further include a lower portion, an intermediate portion, and an upper portion sequentially located between the first end and the second end. The data collection mast may further comprise a top plate fixedly secured to the second end of the main member.

The data collection mast may further comprise a first enclosure fixedly secured to and surrounding the lower portion of the main member. The data collection mast may further comprise a second enclosure fixedly secured to and surrounding the intermediate portion of the main member.

The data collection mast may further comprise a first cantilever member having a first end and a second end, the first end fixedly secured to the intermediate portion of the main member, and the second end located at a position radially beyond the second enclosure from the main member, such that the first cantilever member is perpendicular to the main member. The data collection mast may further comprise a second cantilever member having a first end and a second end, the first end fixedly secured to the upper portion of the main member, and the second end at a position radially outward from the main member and axially above the top plate.

The method further comprises collecting environmental image data with a pair of stereoscopic cameras disposed on the intermediate portion of the main member. The second enclosure may include a pair of apertures and the pair of stereoscopic cameras, and the pair of stereoscopic cameras may align with the pair of apertures. The method further comprises collecting environmental radar data with a radar system disposed on the top plate. The method further comprises collecting orientation data with a compass disposed on the second end of the second cantilever member. The method further comprises collecting 3-D image data from a LIDAR unit disposed on the second end of the first cantilever member.

The method further comprises transmitting the environmental image data, the environmental radar data, the orientation data, and the 3-D image data to a control unit fixedly secured to the lower portion of the main member and located within the first enclosure. The control unit may be in electronic communication with the pair of stereoscopic cameras, the radar system, the compass, and the LIDAR unit.

The method may further comprise operating, via the control unit, a maritime vessel based on the environmental image data, the environmental radar data, the orientation data, and the 3-D image data.

DESCRIPTION OF THE DRAWINGS

For a fuller understanding of the nature and objects of the disclosure, reference should be made to the following detailed description taken in conjunction with the accompanying drawings, in which:

FIG. 7 shows a flow chart of the presently disclosed method for operating a sensor system.

DETAILED DESCRIPTION OF THE DISCLOSURE

Although claimed subject matter will be described in terms of certain embodiments, other embodiments, including embodiments that do not provide all of the benefits and features set forth herein, are also within the scope of this disclosure. Various structural, logical, process step, and electronic changes may be made without departing from the scope of the disclosure. Accordingly, the scope of the disclosure is defined only by reference to the appended claims.

The present disclosure provides for a sensor system for use in autonomous vehicle navigation. Referring to FIG. 1, the sensor system 1000 is configured such that it may be installed on a vehicle as part of an autonomous navigation system. The vehicle may be a marine vessel such as a ship or boat.

Figure 1A:
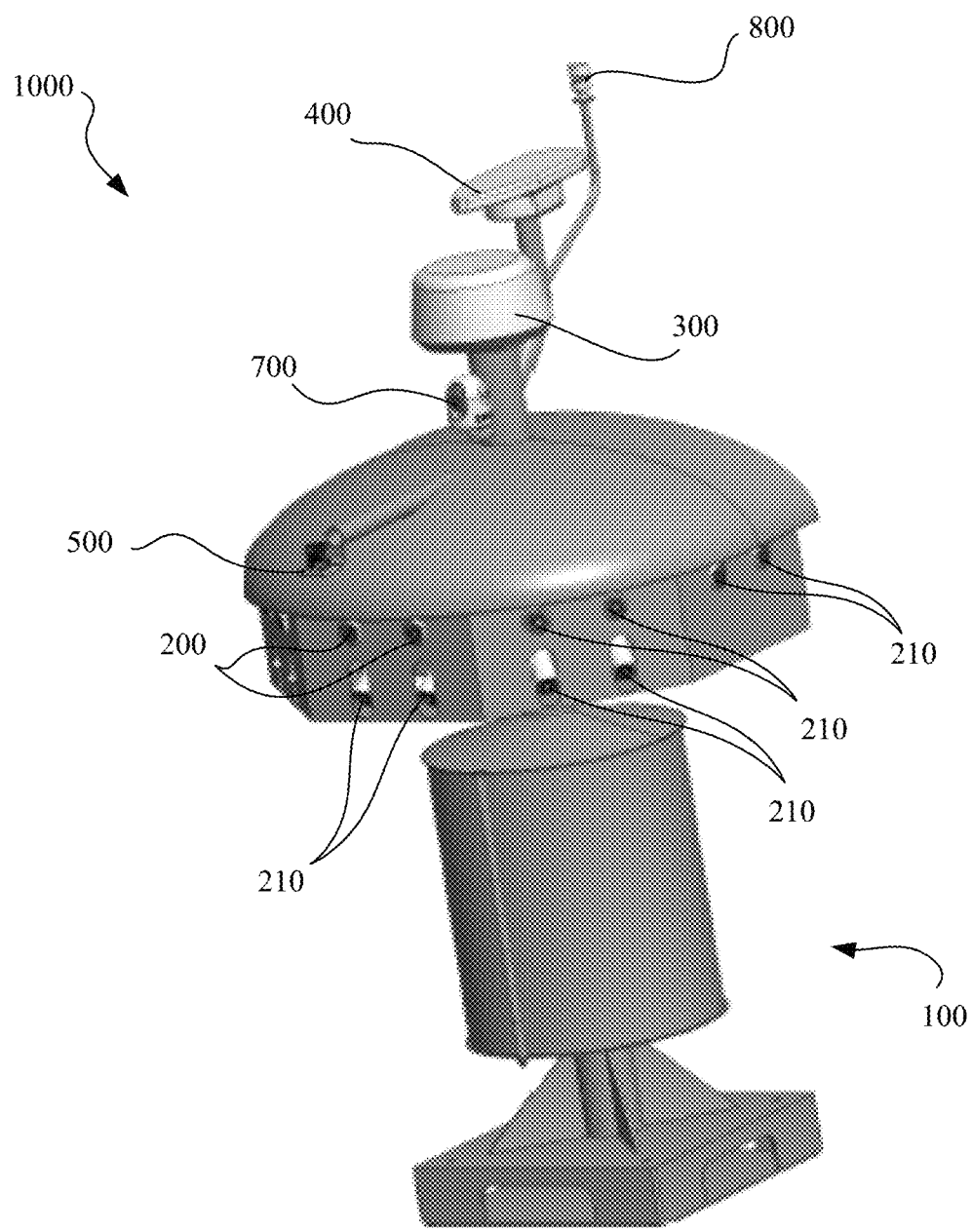
FIGS. 1a-1g show an embodiment of the presently disclosed sensor system.
Figure 1E:
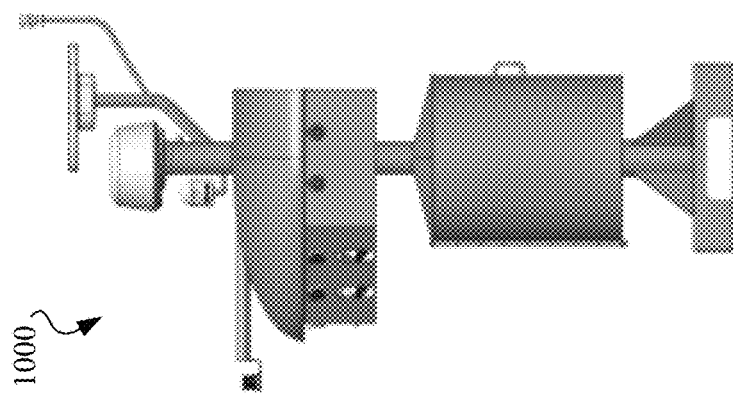
Figure 1D:
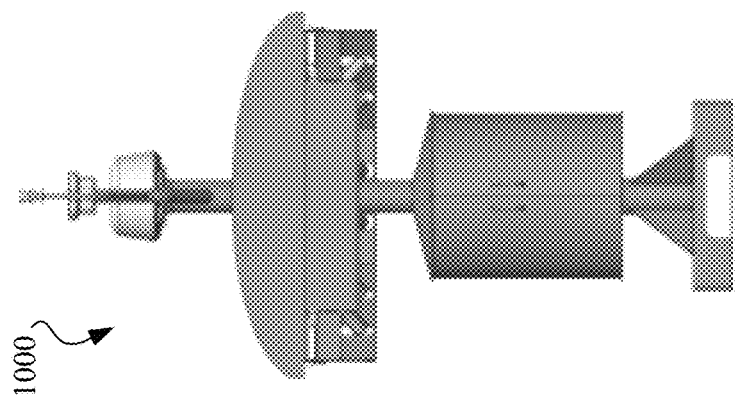
Figure 1C:
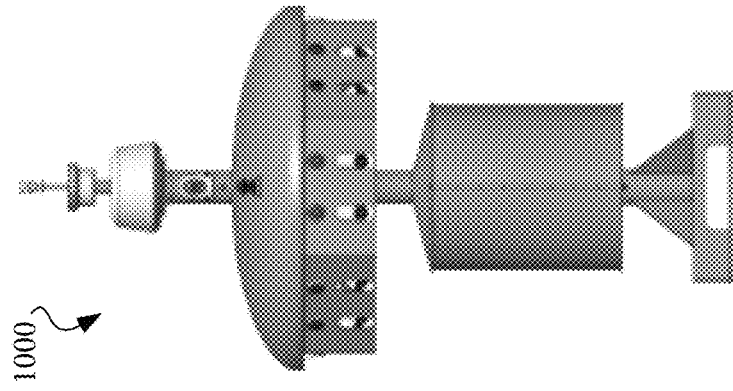
Figure 1B:
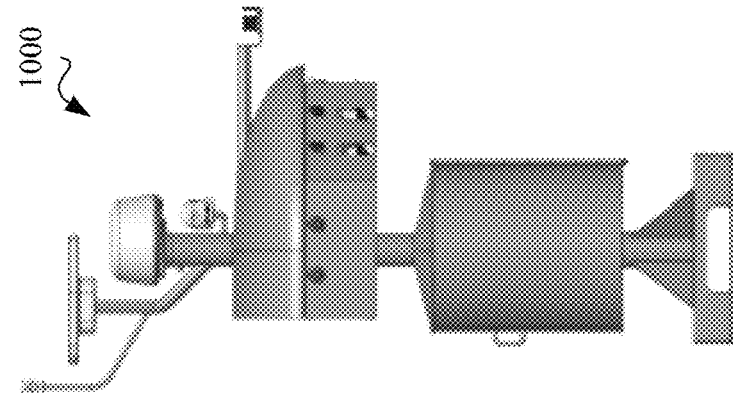
Figure 1F:
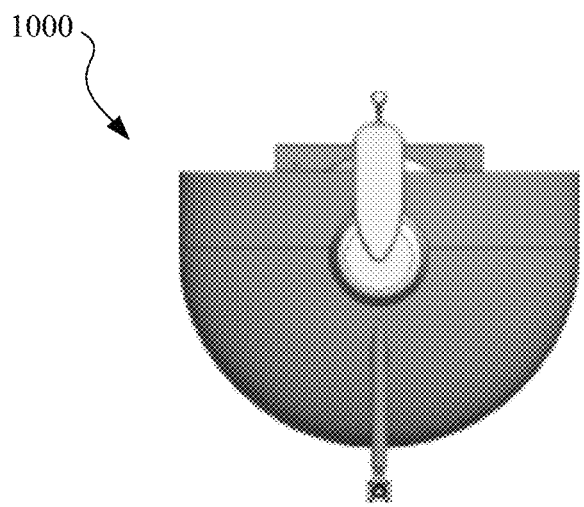
Figure 1G:
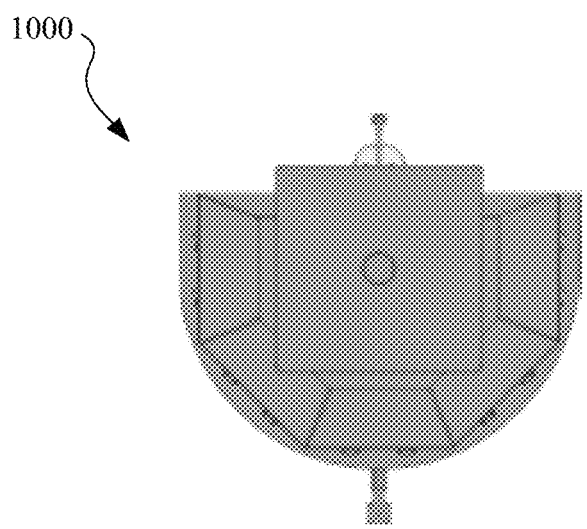
Figure 2:
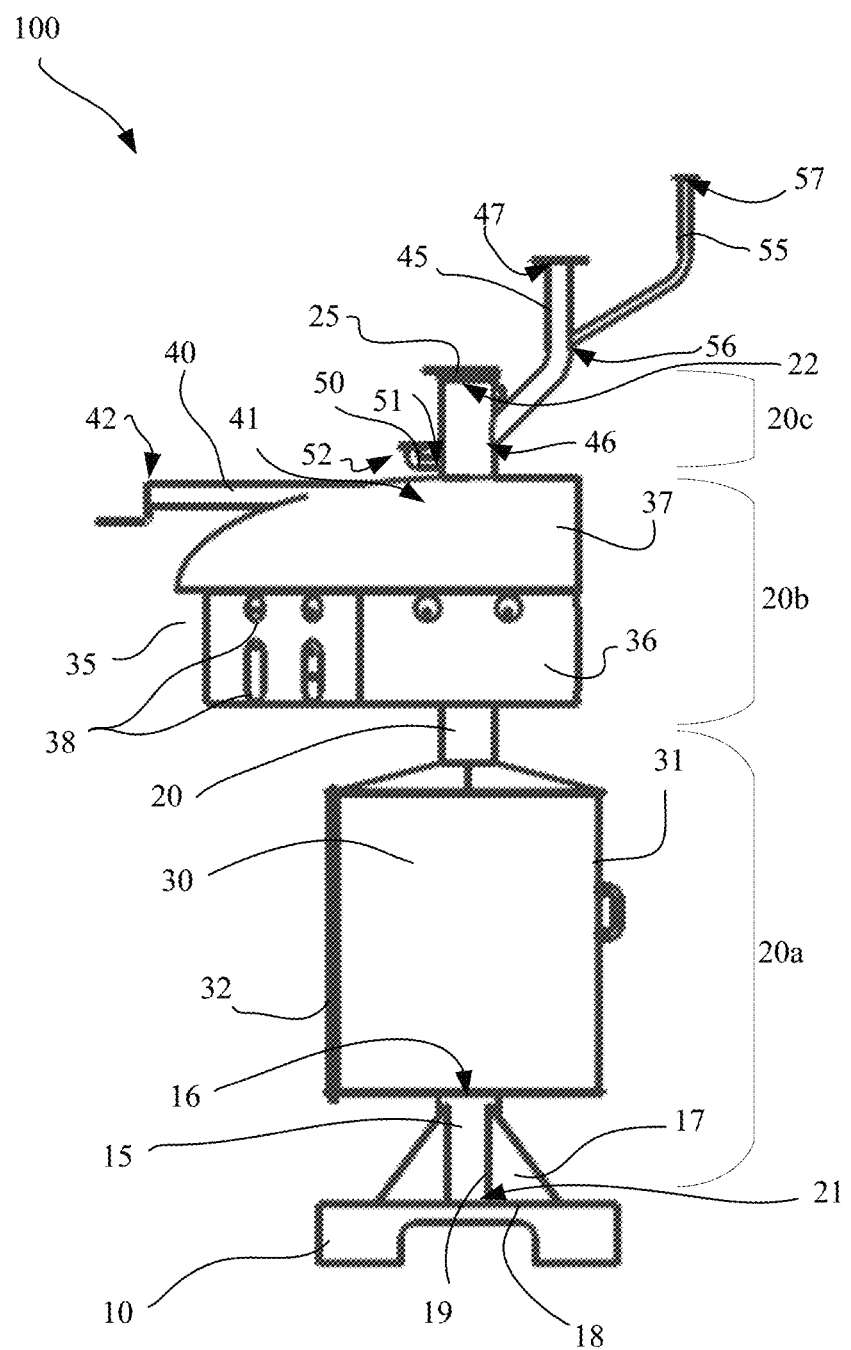
FIG. 2 shows an embodiment of a data collection mast of the presently disclosed sensor system.

In an embodiment of the present disclosure, as shown in FIG. 2, the sensor system 1000 comprises a data collection mast 100. The data collection mast 100 may comprise a base 10. The base 10 may be fixedly secured to the deck of a marine vessel. For example, the base 10 may be welded or bolted to the deck. In an embodiment of the present disclosure, the base 10 may have a square shape. Other shapes for the base 10 are possible.

The data collection mast 100 may further comprise a support member 15. The support member 15 may be fixedly secured to the base 10. For example the support member 15 may be welded to the base 10. The support member 15 may define an axial through bore 16 therein.

The support member 15 may comprise one or more gusset members 17. The gusset members 17 may be circumferentially arranged around the support member 15. Each gusset member 17 may have a first edge 18 and a second edge 19 perpendicular to the first edge 18. The first edge 18 may be fixedly secured to the base 10. For example, the first edge 18 may be welded to the base 10. The second edge 19 may be fixedly secured to a radial face of the support member 15. For example, the second edge 19 may be welded to a radial face of the support member 15.

In an embodiment of the present disclosure, the support member 15 comprises four gusset members 17 circumferentially arranged around the support member 15. Each gusset member 17 may have a triangular shape, though other shapes are possible. The first edge 18 of each gusset member 17 may be directed toward a corner of the base 10. The support member 15 with gusset members 17 provides structural support for the data collection mast 100 for securing to the base 10.

The data collection mast 100 may further comprise a main member 20. The main member 20 may have a first end 21 disposed within the through bore 16 of the support member 15. The main member 20 may have a second end 22 opposite the first end 21. The main member may further include a lower portion 20a, an intermediate portion 20b, and an upper portion 20c. The lower portion 20a, intermediate portion 20b, and upper portion 20c may be sequentially located between the first end 21 and the second end 22 of the main member 20.

In an embodiment of the present disclosure, the main member 20 is hollow.

The data collection mast 100 may further comprise a top plate 25. The top plate 25 may be fixedly secured to the second end 22 of the main member 20. For example, the top plate 25 may be welded to the second end 22 of the main member 20.

The data collection mast 100 may further comprise a first enclosure 30. The first enclosure 30 may be fixedly secured to and surround the lower portion 20a of the main member 20.

In an embodiment of the present disclosure, the first enclosure 30 may have a cylindrical shape, though other shapes are possible. The first enclosure 30 may comprise a pair of doors 31. The pair of doors 31 may be rotatably connected by a hinge 32, and may be selectively secured by a latch 33. The hinge 32 may be on the front-facing side of the first enclosure 30, while the latch 33 may be on the rear-facing side of the first enclosure 30. The pair of doors 31 may be rotated about the hinge 32 in order to expose the contents of the data collection mast 100 within the first enclosure 30. The pair of doors 31 may be secured via the latch 33 in order to protect the contents of the data collection mast 100 within the first enclosure 30.

The data collection mast 100 may further comprise a second enclosure 35. The second enclosure 35 may be fixedly secured to and surround the intermediate portion 20b of the main member 20.

In an embodiment of the present disclosure, the second enclosure 35 may have a lower portion 36 with an irregular hexagonal prism shape and an upper portion 37 with a spherical cap shape. Other shapes are possible. The lower portion 36 of the second enclosure 35 may define a pair of apertures 38 therein.

The data collection mast 100 may further comprise a first cantilever member 40. The first cantilever member 40 may have a first end 41 and a second end 42 opposite the first end 41. The first end 41 of the first cantilever member 40 may be fixedly secured to the intermediate portion 20b of the main member 20. The second end 42 of the first cantilever member 40 may be positioned radially beyond the second enclosure 35.

In an embodiment of the present disclosure, the first cantilever member 40 may be perpendicular to the main member 20. The first cantilever member 40 may protrude from the upper portion 37 of the second enclosure 35.

The data collection mast 100 may further comprise a second cantilever member 45. The second cantilever member 45 may have a first end 46 and a second end 47 opposite the first end 46. The first end 46 of the second cantilever member 45 may be fixedly secured to the upper portion 20c of the main member 20. The second end 47 of the second cantilever member 45 may be positioned radially outward from the main member 20 and axially above the top plate 25.

In an embodiment of the present disclosure, the second cantilever member 45 may be at a 45 degree angle with the main member 20 at the first end 46, and parallel to the main member 20 at the second end 47. In this embodiment, the second cantilever 45 member may have a j-shape. Other shapes are possible.

Referring to FIG. 1, the sensor system 1000 may further comprise a pair of stereoscopic cameras 200. The pair of stereoscopic cameras 200 may be disposed on the intermediate portion 20b of the main member 20. The pair of stereoscopic cameras 200 may further align with the pair of apertures 38 of the second enclosure 35. The pair of stereoscopic cameras 200 may be configured to collect environmental image data that can then be used to estimate depth or distance. The pair of stereoscopic cameras 200 may be positioned at a height on the data collection mast 100 that prevents obstructing their view. For example, the pair of stereoscopic cameras 200 may be positioned above any railings on the vessel.

The pair of stereoscopic cameras 200 may be tilt-adjusted to provide optimal environmental image data from the horizon. The pair of stereoscopic cameras 200 may be arranged at a distance of approximately six inches from each other, though other distances are possible.

In an embodiment of the present disclosure, the sensor system 1000 may further comprise additional pairs of stereoscopic cameras 210. The additional pairs of stereoscopic cameras 210 may be positioned at an angle relative to the pair of stereoscopic cameras 200. For example, the additional pairs of stereoscopic cameras 210 may be positioned at an angle beneath the horizon relative to the pair of stereoscopic cameras 200. The additional pairs of stereoscopic cameras 210 may further be positioned at an angle to the left or right of the pair of the stereoscopic cameras 200. For example, the additional pairs of stereoscopic cameras 210 may be positioned at an angle relative to the pair of stereoscopic cameras 200 of 30 degrees, 45 degrees, or 90 degrees.

The angles and configuration of the additional pairs of stereoscopic cameras 210 on the data collection mast 100 can vary from what is illustrated or described depending on the vessel or a particular application. Thus, the embodiments disclosed herein are exemplary.

The additional pairs of stereoscopic cameras 210 may be used to observe anomalies outside of the field of the view of the pair of stereoscopic cameras 200. Accordingly, the additional pairs of stereoscopic cameras 210 provide a wider field of view for the environmental image data. The additional pairs of stereoscopic cameras 210 may be used to observe the horizon or near objects.

The sensor system 1000 may further comprise a radar system 300. The radar system 300 may be disposed on the top plate 25. The radar system 300 may be at a position of unrestricted assessment of the immediate horizon. The radar system 300 may be configured to collect environmental radar data, including information regarding marine objects such as navigation buoys, floating debris, and other marine vessels, as well as information regarding nearby shorelines in a 360 degree view around the radar system. The radar system 300 may be a frequency-modulated continuous wave ("FMCW") radar system. The radar system 300 may be a 3G or 4G broadband radar system.

In an embodiment of the present disclosure, the radar system 300 may be a SIMRAD system. The radar system 300 may be 3G or 4G.

The radar system 300 can be configured to provide radar coverage both at a distance from the vessel and proximate to the vessel. For example, the radar system 300 may have a range 5 feet to 24 nautical miles.

The sensor system 1000 may further comprise a compass 400. The compass 400 may be disposed on the second end 47 of the second cantilever member 45. The compass 400 may be positioned above the radar system 300 to allow accurate positional and heading indications. The compass 400 may be configured to collect orientation data. The compass 400 may be a gyrocompass configured to collect orientation data according to the rotation of the Earth. The compass 400 may also be a satellite compass. The satellite compass may be configured to collect orientation data according to Global Positioning Satellite ("GPS") information.

The sensor system 1000 may further comprise a LIDAR unit 500. The LIDAR unit 500 may be disposed on the second end 42 of the first cantilever member 40. For example, the LIDAR unit 500 may be a unit produced by Velodyne, Ouster, or other manufacturers. The LIDAR unit 500 may have between 16 and 128 beams. The beams of the LIDAR unit 500 may spin at a rate of 300-2000 rpm. For example, the beams of the LIDAR unit 500 may spin at a rate of 600 rpm. In an embodiment of the present disclosure, the LIDAR unit 500 is an Ouster OS1-64 LIDAR unit. The LIDAR unit 500 may be configured to collect 3-D image data.

The sensor system 1000 may further comprise a control unit 600. The control unit 600 may be disposed on the lower portion 20a of the main member 20 within the first enclosure 30. The control unit 600 may be in electronic communication with the pair of stereoscopic cameras 200, the radar system 300, the compass 500, and the LIDAR unit 500. The control unit 600 may also be in electronic communication with the additional pairs of stereoscopic cameras 210.

The data collection mast 100 may further comprise a third cantilever member 50, as shown in FIG. 2. The third cantilever member 50 may have a first end 51 and a second end 52 opposite the first end 51. The first end 51 of the third cantilever member 50 may be fixedly secured to the upper portion 20c of the main member 20. The second end 52 of the third cantilever member 50 may be positioned radially outward from the main member 20 and axially above the first end 51 of the third cantilever member 50.

In an embodiment of the present disclosure, the third cantilever member 50 may be perpendicular to the main member 20 at the first end 51, and parallel to the main member 20 at the second end 52. The third cantilever member 50 may have an elbow shape.

The sensor system 1000 may further comprise a thermal camera 700, as shown in FIG. 1. The thermal camera 700 may be disposed on the second end 52 of the third cantilever member 50. The thermal camera 700 may be an infrared camera or a bolometer. The thermal camera 700 may be configured to collect thermal image data. The thermal camera 700 may be in electronic communication with the control unit 600.

The data collection mast 100 may further comprise a fourth cantilever member 55, as shown in FIG. 2. The fourth cantilever member 55 may have a first end 56 and a second end 57 opposite the first end 56. The first end 56 of the fourth cantilever member 55 may be fixedly secured to the second cantilever member 45. The second end of the fourth cantilever member 55 may be positioned radially beyond the second cantilever member 45 and axially above the second end 47 of the second cantilever member 45.

In an embodiment of the present disclosure, the fourth cantilever member 55 may be at a 45 degree angle with the second cantilever member 45 at the first end 56, and parallel to the second cantilever member 45 at the second end 57. The fourth cantilever member 55 may have a j-shape.

The sensor system 1000 may further comprise an ultrasonic weather monitor 800, as shown in FIG. 1. The ultrasonic weather monitor 800 may be disposed on the second end 57 of the fourth cantilever member 55. The ultrasonic weather monitor 800 may be configured to collect weather data including wind speed and direction, barometric pressure, air temperature, and wind chill temperature. The ultrasonic weather monitor 800 may be in electronic communication with the control unit 600.

In an embodiment of the present disclosure, each of the first cantilever member 40, second cantilever member 45, third cantilever member 50, and fourth cantilever member 55 are hollow. In communication with the hollow main member 20, the wiring for each of the pair of stereoscopic cameras 200, radar 300, compass 400, LIDAR unit 500, thermal camera 700, and ultrasonic weather monitor 800 can be routed internally to the control unit 600.

In an embodiment of the present disclosure, the various components of the sensor system 1000 may be waterproof and/or resistant to the elements. For example, the sensor system 1000 may be constructed of steel. The sensor system 1000 may include polycarbonate or acrylic components to prevent frost. The sensor system 1000 may be constructed of steel or aluminum. The sensor system 1000 may be coated in zinc white layer paint (to prevent corrosion), and/or a special hydrophobic spray coat for waterproofing. Additionally, quartz radiant infrared heaters may be added for defrosting and ice formation prevention.

Figure 3A:
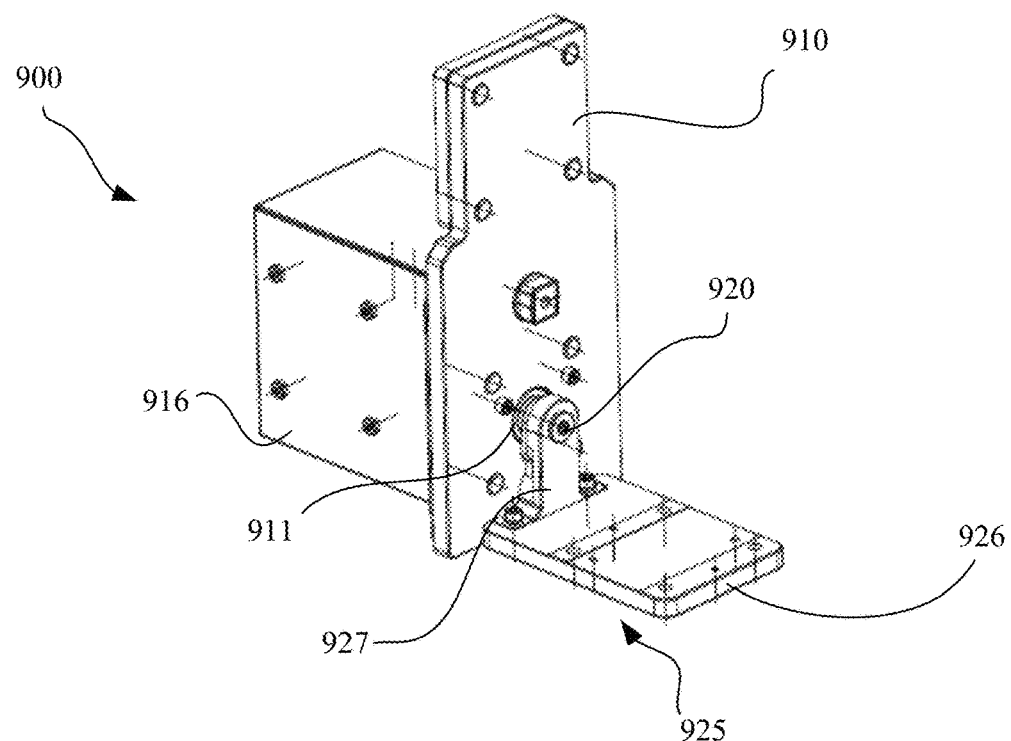
FIGS. 3a and 3b show an embodiment of a mounting assembly of the presently disclosed sensor system.
Figure 3B:
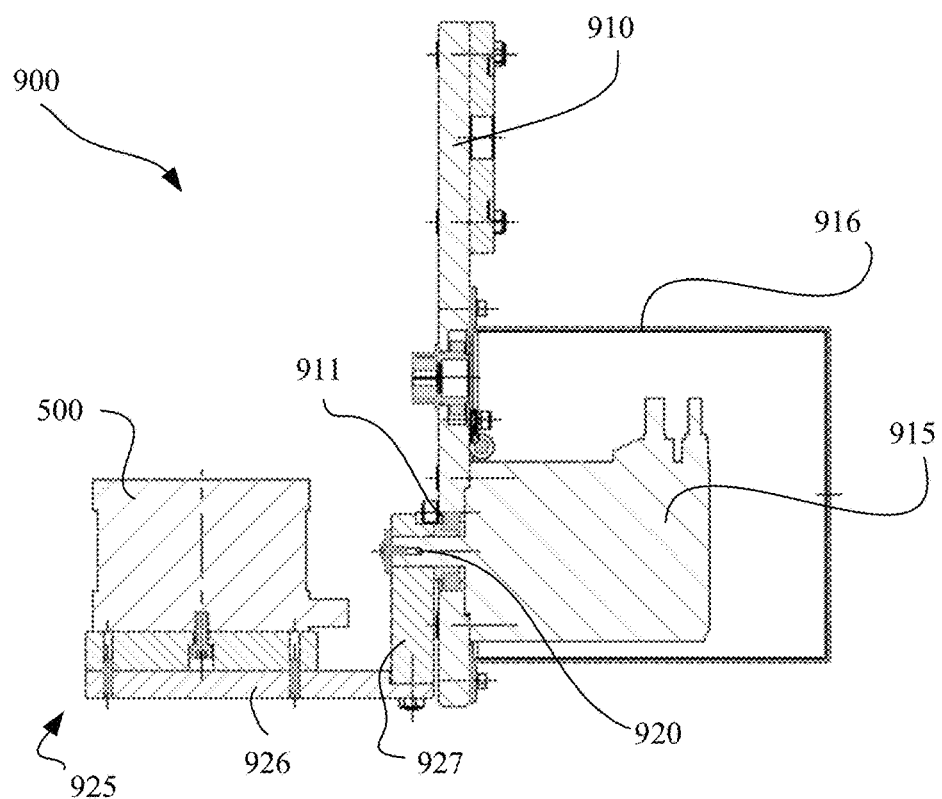

Referring to FIGS. 3a and 3b, the sensor system may further comprise a mounting assembly 900. The mounting assembly 900 may comprise a mounting member 910. The mounting member 910 may be fixedly secured to the second end 42 of the first cantilever member 40. The mounting member 910 may define a hole 911 therein. The hole 911 may be centrally positioned in the mounting member 910.

The mounting assembly 900 may further comprise a motor 915. The motor 915 may be fixedly secured to the mounting member 910. The motor 915 may be in electronic communication with the control unit 600. The motor 915 may be configured to drive an axle 920. The axle 920 may be positioned to extend through the hole 911 of the mounting member 910.

In an embodiment of the present disclosure, the motor 915 may be enclosed by a housing 916. The housing 916 may be fixedly secured to the mounting member 910. The mounting member 910 may be fixedly secured to the second end 42 of the first cantilever member 40. Accordingly, the housing 916 may be positioned below the second end 42 of the first cantilever member 40.

The mounting assembly 900 may further comprise a carriage 925. The carriage 925 may comprise a planar member 926 and a flange member 927 perpendicular to the planar member 926. The flange member may be fixedly secured to the planar member 926 and to the axle 920. The LIDAR unit 500 may be disposed on the planar member 926. The motor 915 may be configured to rotate the carriage 925 and the LIDAR unit 500 disposed thereon.

In an embodiment of the present disclosure, the motor 915 may be configured to rotate the carriage 925 according to a cycle comprising rotation in a first direction followed by rotation in a second, reverse direction. For example, the cycle may comprise rotation of 180 degrees in a first direction, followed by rotation of 180 degrees in a second, reverse direction. With the cycle of rotation of the present disclosure, twisting of wires connected to the LIDAR unit 500 is reduced, improving the durability of the sensor system 1000. The motor 915 may be configured to rotate the carriage 925 at a rate of 12-60 rpm. For example, the motor 915 may be configured to rotate the carriage 925 at a rate of 20 rpm.

With the rotation of the LIDAR unit 500 provided by the present disclosure, 3-D image data can be collected from all directions with a single LIDAR unit 500. For example, the angle of the motor 915 can be tracked and synchronized with image data collected from the LIDAR unit 500 to generate 3-D image data. Three or four stationary LIDAR units would be needed to achieve the same field of view for the 3-D image data collected by the rotating LIDAR unit 500. This enables the sensor system 1000 to create a 3-D map of the vessel's surroundings.

Figure 4:
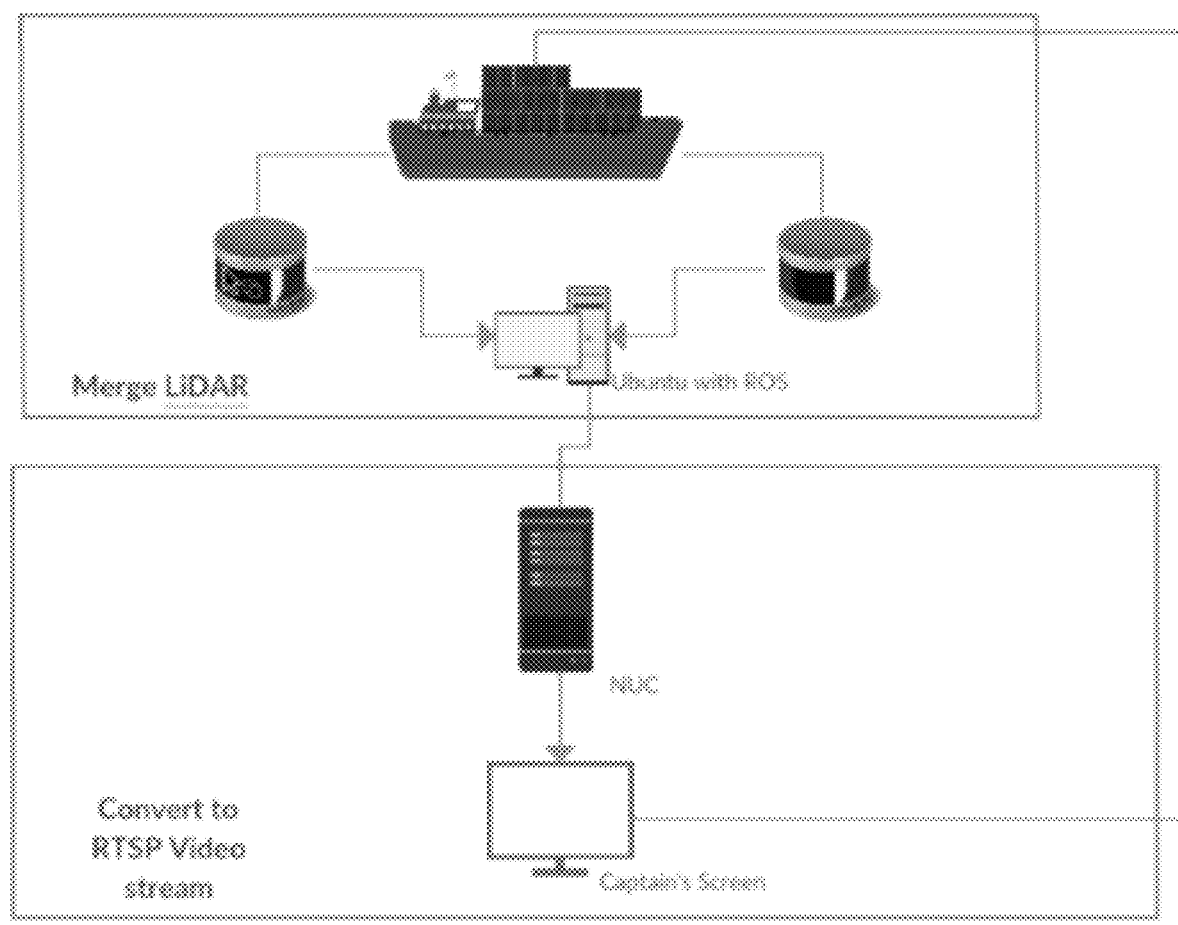
FIG. 4 is a diagram of LIDAR visualization.

FIG. 4 is a diagram of LIDAR visualization. LIDAR can be used to provide visualization during close distance maneuvers like while docking or passing other ships in rivers. LIDAR installation transcends Point Cloud visualization application and assists with self-navigation.

The sensor system 1000 may further include a GPS unit in communication with the control unit 600. The GPS unit may be configured to collect orientation and navigation data.

The sensor system 1000 may further include an automatic identification system ("AIS"), such as a Class B AIS. Class B means that the system does not include a transmitter, whereas Class A includes a transmitter and transceiver. The AIS can provide information about the location of the vessel.

The sensor system 1000 may further include a depth finder. The depth finder may be included on the vessel, in which case the sensor system 1000 can be in electronic communication with the vessel's depth finder or a controller on the vessel with access to data from the vessel's depth finder. In another instance, nautical charts can be used to provide depth information, and the sensor system can access a library or database of nautical charts.

Other inputs may be provided to the control unit 600. For example, the control unit 600 may receive communications or alerts about maritime traffic, weather, or safety issues. The sensor system 1000 may provide audio alerts based on communications received by the control unit 600 from the various sensors or other sources.

The control unit 600 may be configured to retrieve data collected by the aforementioned sensors and devices, and further process the collected data to, for example, generate a navigation path. The control unit 600 may include computer. The control unit 600 also may be in electronic communication with or include touchscreen monitor. The control unit 600 may include a mobile hotspot configured to provide the control unit 600 with Internet access. The mobile hotspot may be, for example, a JETPACK® 4G Mobile Hotspot in the form of a dongle. The control unit 600 may process the collected data using artificial intelligence systems. For example, the control unit 600 may be in electronic communication with an object detection network, which may include a convolutional neural network (CNN).

All the sensors can be connected to the control unit 600, where the sensor outputs can be combined into a single monitor or output. Thus, the data packets can be synthesized together. CANBUS can be converted to a USB stream or an Ethernet packet to image the stream. Individual sensor frequencies can be controlled by the control unit 600. The control unit 600 and the sensors can use a single power supply or multiple power supplies. Each of the sensors may be connected to the control unit 600 via wireless communication. Wired communication may be provided between each sensor and the control unit 600 as backup. For example, all the sensors may be connected to a switch of the control unit 600 via CAT6 Ethernet cables. The switch may be connected to a computer via CAT6 Ethernet cables of Fiber Optic cables.

The control unit 600 may be arranged within the first enclosure 30. The first enclosure 30 may be configured to protect the control unit 600 and other enclosed devices from the outside environment. The first enclosure 30 may also be configured to supply the control unit 600 and other enclosed devices with power. Backup power may be provided for each sensor unit from the pilot house. The sensors may be powered through a smart power supply, through which the power consumption of each sensor may be monitored and managed. The smart power supply may be connected to an uninterruptible power supply (UPS) in order to provide constant power to the sensor system 1000. For example, the UPS may be a 1500 W marine power supply that is agnostic to grounding errors.

Figure 5:
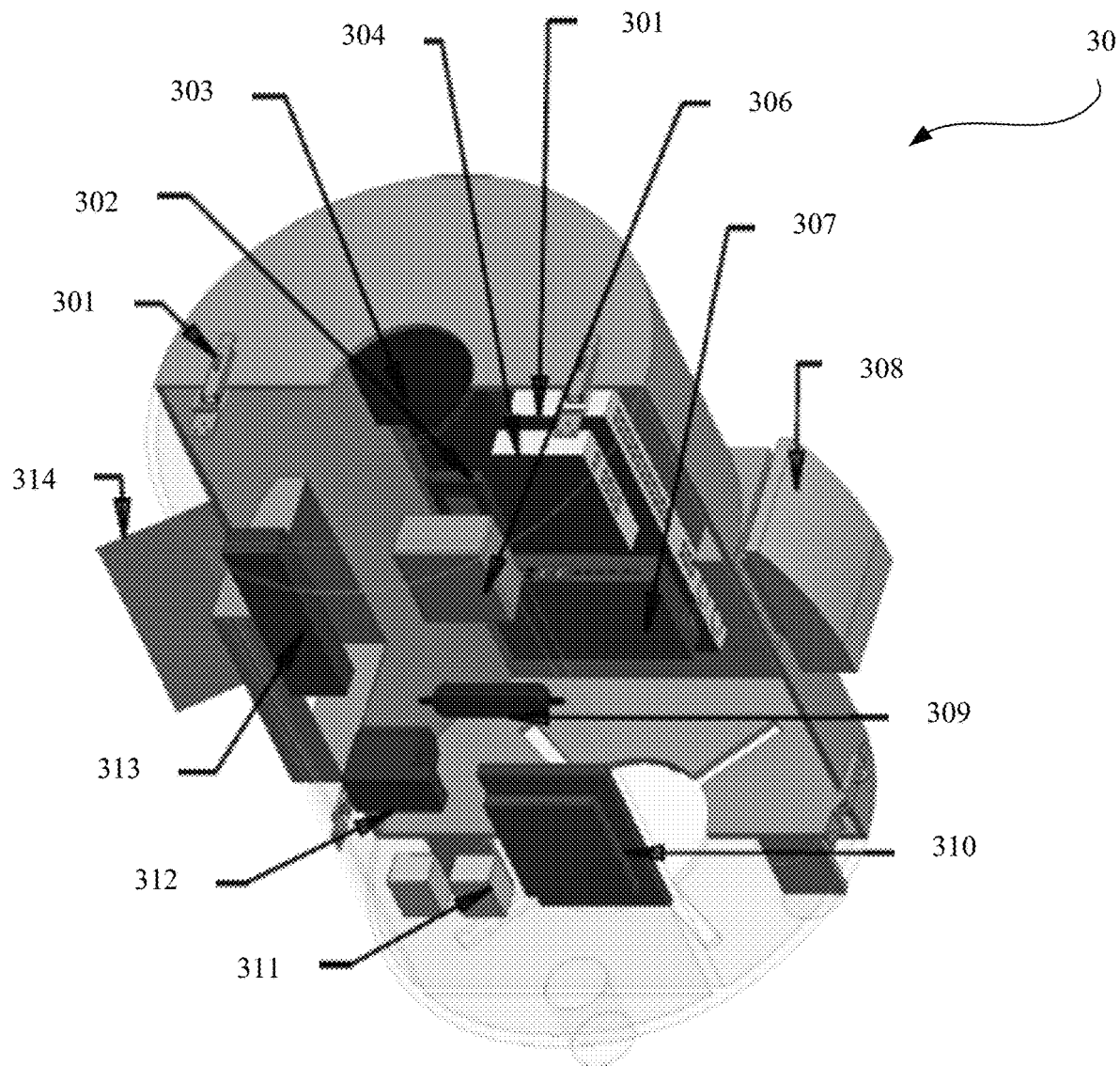
FIG. 5 shows an embodiment of a first enclosure of the presently disclosed sensor system.

An embodiment of a first enclosure 30 is shown in FIG. 5. The first enclosure 30 may include one or more draw latches 301 to open and close the first enclosure 30. The first enclosure 30 may include a mobile hotspot 302 for providing Internet access, such as a JETPACK® 4G Mobile Hotspot dongle. The first enclosure 30 may include a hard drive 303 of sufficient capacity to store sensor data, such as 20 terabytes. The first enclosure 30 may include one or more computer network switches 304 and 305, such as NVT PHYBRIDGE FLEX8™ or FLEX24™. The first enclosure 30 may include a DC power supply 306 to supply power the components therein. The first enclosure 30 may include a computer 307, such as an INTEL® NUC 8 Mini PC Kit. The first enclosure 30 may include a filter fan 308. The first enclosure 30 may include an Actisense sensor 309, which can convert data packets to, for example, plain English. The first enclosure 30 may include a computer network router 310. The first enclosure 30 may include a thermostat 311 for monitoring interior temperature. The first enclosure 30 may include a heater 312, to prevent freezing of the components therein. The first enclosure 30 may include a multiport power outlet 313, for example a 12-port power outlet. The first enclosure 30 may include an access panel 314. The first enclosure 30 may also include a NMEA bridge and wireless adapter.

Figure 6:
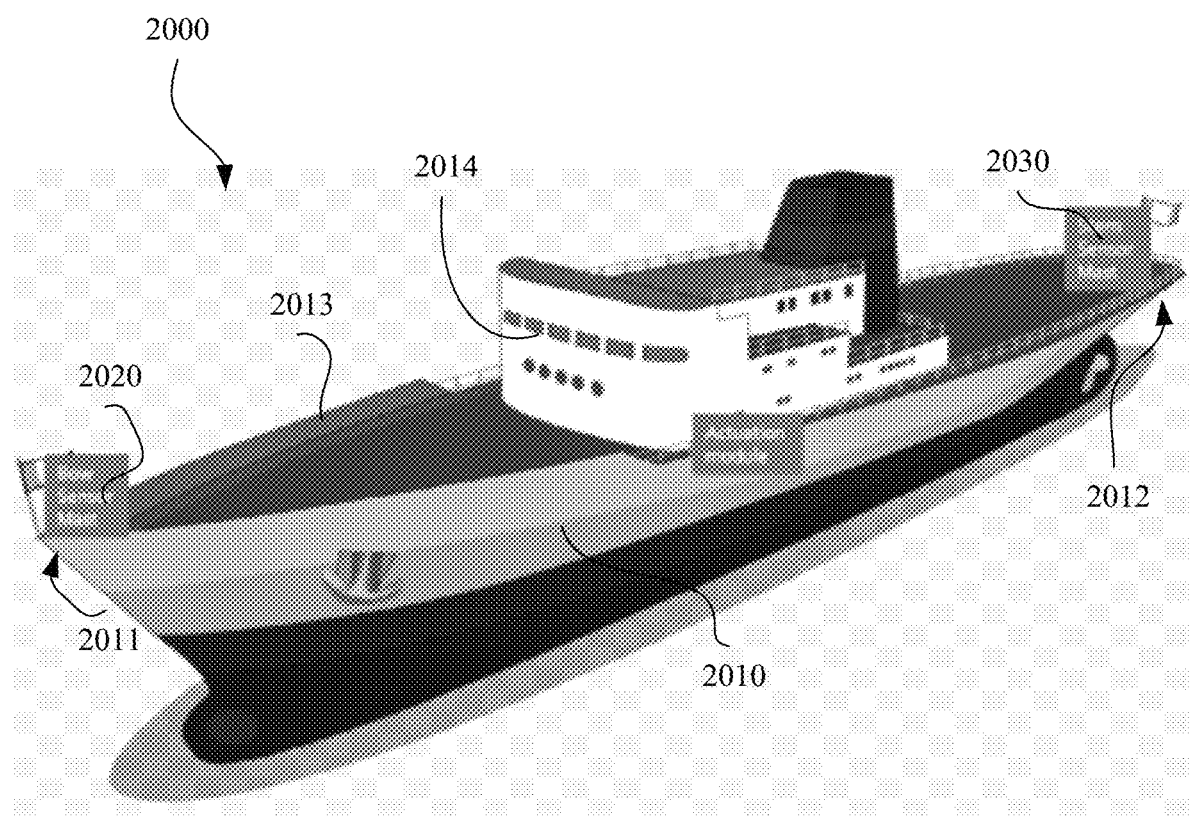
FIG. 6 shows an embodiment of the presently disclosed maritime vessel sensor system.

In another aspect of the present disclosure, and with reference to FIG. 6, a maritime vessel sensor system 2000 is presented. The maritime vessel sensor system 2000 includes a maritime vessel 2010 and a first sensor subsystem 2020. The first sensor subsystem 2020 may be identical to the sensor system 1000, and is thus not elaborated herein.

The maritime vessel sensor system 2000 may further include a second sensor subsystem 2030. The second sensor subsystem 2030 may be identical to the sensor system 1000, and is thus not elaborated herein. The second sensor subsystem 2030 may be the same as or different from the first sensor subsystem 2020. For example, the number of and arrangement of sensors on the second sensor subsystem 2030 may be different than that of the first sensor subsystem 2020. A third, fourth, fifth, or larger number of sensor subsystems also can be included in the maritime vessel sensor system 2000.

In an embodiment of the present disclosure, the first sensor subsystem 2020 may be mounted to the bow 2011 of the maritime vessel 2010. The second sensor subsystem 2030 may be mounted to the stern 2012 of the maritime vessel 2010. The first and second sensor subsystems 2020, 2030 may also be mounted in any other appropriate areas of the maritime vessel 2010. The various sensors of the first and second sensor subsystems 2020, 2030 may be synchronized or precise measurement. For example, the data collected by each radar, compass, etc. may be averaged for better precision. Robot Operating System (ROS) virtual time synchronization may be used to synchronize sensors that use ROS. General Network Time Protocol (NTP) may be used to synchronize non-ROS sensors.

The various sensors of the first and second sensor subsystems 2020, 2030 may be configured to prevent dead zones and interference. For example each LIDAR unit may be on a separate channel. By keeping the data collected by the various sensors on their own subnetworks, network flooding may be avoided.

The first and second sensor subsystems 2020, 2030 can be placed on the maritime vessel 2010 so that their respective field of view is not blocked. Thus, the first and second sensor subsystems 2020, 2030 may be placed proximate a gunwale 2013. The first and second sensor subsystems 2020, 2030 also may be positioned to avoid blocking a view from the pilot's house 2014 or a crow's nest.

In the first and second sensor subsystems 2020, 2030, an anemometer is placed on top to catch the wind, but not in a manner that blocks the front of the radar system 300. For example, the anemometer may be mounted behind the compass 400.

The maritime vessel 2010 may be, for example, a speed boat, a cargo vessel, a personal recreational boat, a catamaran, a ski boat, or a yacht. The maritime vessel 2010 may also be any other type of vessel on which mounting a sensor subsystem would be practical and/or desired.

The design of each sensor subsystem 2020, 2030 can be changed depending on the type of maritime vessel 2010. These changes can include the differences in the mounting assembly 900, number of additional stereoscopic cameras 210, inclination of the cameras 200, 210, or other features. The number of additional stereoscopic cameras 210 and inclination of the cameras 200, 210 can change depending on the size of the vessel and the vessel's height. The cameras 200, 210 may be positioned to provide the best field of view. Furthermore, smaller vessels may only need a single sensor subsystem 2020.

While disclosed specifically with maritime vessels, the embodiments disclosed herein can be applied to other vehicles such as automobiles, trucks, buses, trains or other vehicles.

In another aspect of the present disclosure, and with reference to FIG. 7, a method 3000 for operating a sensor system is disclosed. The method 3000 for operating a sensor system includes providing 3100 a data collection mast. The data collection mast provided may be according to the data collection mast 100 described above, and is thus not elaborated herein.

The method 3000 further includes collecting 3200 environmental image data with a pair of stereoscopic cameras disposed on the data collection mast; collecting 3300 environmental radar data with a radar system disposed on the data collection mast; collecting 3400 orientation data with a compass disposed on the data collection mast; and collecting 3500 3-D image data from a LIDAR unit disposed on the data collection mast.

The pair of stereoscopic cameras, radar system, compass, and LIDAR unit are provided according to their description as part of the sensor system 1000 herein, and are thus not elaborated herein The method 3000 further includes transmitting 3600 the environmental image data, environmental radar data, orientation data, and 3-D image data to a control unit. The control unit is provided according to the description as part of the sensor system 1000 herein, and is thus not elaborated herein.

The method 3000 for operating a sensor system may further include collecting additional environmental image data with one or more additional cameras, wherein the additional cameras in communication with the control unit; and transmitting the additional environmental image data to the control unit.

The method 3000 for operating a sensor system may further include collecting positioning data with a GPS unit, wherein the GPS unit is in communication with the control unit; and transmitting the positioning data to the control unit.

The method 3000 for operating a sensor system may further include collecting weather data with an ultrasonic weather monitor, wherein the ultrasonic weather monitor is in communication with the control unit; and transmitting the positioning data to the control unit.

The method 3000 may further include operating 3700, via the control unit, a maritime vessel based on the environmental image data, the environmental radar data, the orientation data, and the 3-D image data.

The control unit can control the maritime vessel it is associated with. For example, the control unit can send instructions to the maritime vessel to change speed or heading. For example, the control unit can include or be in electronic communication with one or more actuators, encoders, and/or controllers, which may alter the rudder direction or motor speed based on data received by the control unit from the various sensors.

Controlling the maritime vessel with the control unit can use encoders or direct connection to the vessel's autopilot. The sensors can output a quadrature signal, and an encoder can count up or down to make a numeric value of what the control should be. Power drops along wire connections can be compensated for with voltage regulators.

In an instance, the control unit reads angle of controls and outputs a buffered I²C signal using high voltage, low current power to allow for relatively long-distance communications and powering. The system can function at a relatively wide range of distances.

Figure 8:
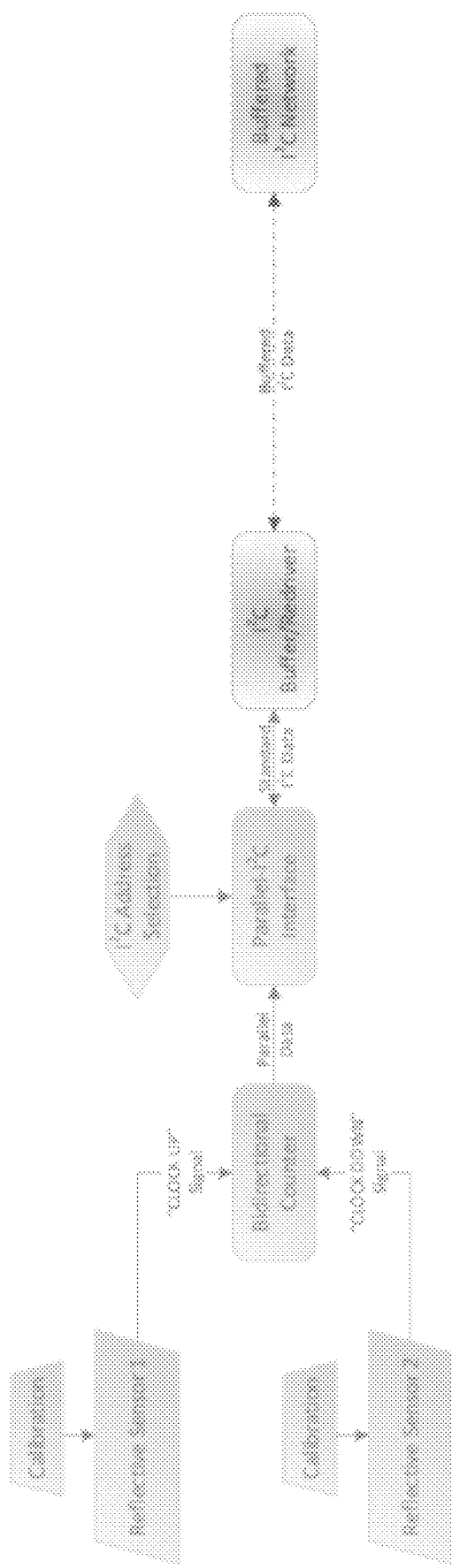
FIG. 8 is a diagram of part of a system in accordance with the present disclosure.

FIG. 8 is a diagram of part of a system. Optical sensors can be calibrated to function at distances from 2.5-50.0 mm. The closer, the higher the precision (i.e., more lines per inch on code strip). The optical sensors can be calibrated to work with various reflective materials and can provide a digital output. Digital signals in quadrature can be produced.

A bi-directional counter can be included, which can include two 4-bit up/down counters daisy-chained together. This can use quadrature signals to count and determine direction. For example, a rising edge of "CLOCK UP" while "CLOCK DOWN" is high counts up 1. In another example, a rising edge of "CLOCK DOWN" while "CLOCK UP" is high counts down 1.

A parallel-I²C interface can be included. This may include a 16-bit I/O extender. Addresses can be set via switches/jumpers to allow up to 64 devices to be connected to the same network. The system can convert the 8 bits from the counters to I²C. Remaining 8 bits can be used for calibration of sensors, resetting of the clocks, etc. The sensors require one bit each to calibrate, the counters require one bit to reset outputs to zero, and the counters require one bit to set outputs to mirror input. The counters could be set using 4 bits by connecting the output bits of the first counter to the input bits of the second counter and performing the reset in two stages The I²C buffer can takes 3.3-5.0 V I²C signal and buffers it while shifting level to 12-15 V. This can increase the amount of wire capacitance permitted and can increase the amount of noise permitted. This also can enable over 100 m of cable to be used.

For power, a 12-15 V input may be used. This can be used to drive I²C buffer. A 3.3-5.0 V switching regulator can drop the voltage internally, which results in lower current draw through the cables and allows longer cables to be used. This can power all components besides the buffer Output images can be obtained from the radar system or systems disclosed herein. The connection with radar can be established by joining different multicast socket groups hosted by the radar. Radar can then be turned on/off by sending specific datagrams to appropriate socket groups. The lowrance radar may be designed to be turned off after 10[K1] seconds once it is turned off. Hence a thread may be spawned to send "stay awake" datagram packets repeatedly to above multicast group.

OpenCPN Radar Pi Java code can be used to capture network traffic from radar and convert them into images (radar's output) to be shown on GUI.

Live stream of radar images can be performed. The output images of radar can be converted into a live mpeg video stream using python flask library. The video stream can then be integrated into Milestone xProtect VMS as a Universal Driver Channel where it can be seen live and recorded.

For video processing, Milestone xProtect VMS can store camera feed internally as blk files, which are not readable by some machine learning algorithms. It also has increased frame rate which makes them play faster than normal. Shell scripts using ffmpeg can be used to convert them into mp4 format and bring the frame rate and playback speed back to normal or as recorded.

Although the present disclosure has been described with respect to one or more particular embodiments, it will be understood that other embodiments of the present disclosure may be made without departing from the scope of the present disclosure. Hence, the present disclosure is deemed limited only by the appended claims and the reasonable interpretation thereof.

What is claimed is:

1. A sensor system, comprising:
   a data collection mast, comprising:
   a base;
   a support member fixedly secured to the base and defining an axial through bore therein;
   a main member having a first end fixedly secured within the through bore of the support member, a second end opposite the first end, wherein the main member further includes a lower portion, an intermediate portion, and an upper portion sequentially located between the first end and the second end;
   a top plate fixedly secured to the second end of the main member;
   a first enclosure fixedly secured to and surrounding the lower portion of the main member;
   a second enclosure fixedly secured to and surrounding the intermediate portion of the main member;
   a first cantilever member having a first end and a second end, the first end of the first cantilever member fixedly secured to the intermediate portion of the main member, and the second end of the first cantilever member located at a position radially beyond the second enclosure from the main member, such that the first cantilever member is perpendicular to the main member; and
   a second cantilever member having a first end and a second end, the first end of the second cantilever member fixedly secured to the upper portion of the main member, and the second end of the second cantilever member at a position radially outward from the main member and axially above the top plate;
   a pair of stereoscopic cameras disposed on the intermediate portion of the main member, wherein the second enclosure defines a pair of apertures, and the pair of stereoscopic cameras align with the pair of apertures;
   a radar system disposed on the top plate;
   a compass disposed on the second end of the second cantilever member;
   a LIDAR unit disposed on the second end of the first cantilever member; and
   a control unit disposed on the lower portion of the main member and located within the first enclosure, wherein the control unit is in electronic communication with the pair of stereoscopic cameras, the radar system, the compass, and the LIDAR unit.

2. The sensor system of claim 1, wherein the data collection mast further comprises:
a third cantilever member having a first end and a second end, the first end of the third cantilever member fixedly secured to the upper portion of the main member, and the second end of the third cantilever member at a position radially outward from the main member and axially above the first end of the third cantilever member, such that the third cantilever member has an elbow shape;
wherein the sensor system further comprises a thermal camera disposed on the second end of the third cantilever member, and wherein the thermal camera is in electronic communication with the control unit.

3. The sensor system of claim 1, wherein the data collection mast further comprises:
a fourth cantilever member having a first end and a second end, the first end of the fourth cantilever member fixedly secured to the second cantilever member, and the second end of the fourth cantilever member at a position radially beyond the second cantilever member from the main member and axially above the second end of the second cantilever member;
wherein the sensor system further comprises an ultrasonic weather monitor disposed on the second end of the fourth cantilever member, and wherein the ultrasonic weather monitor is in electronic communication with the control unit.

4. The sensor system of claim 1, wherein the support member further includes one or more gusset members, wherein each gusset member has a first edge and a second edge perpendicular to the first edge, and wherein the first edge is fixedly secured to the base and the second edge is fixedly secured to a radial face of the support member.

5. The sensor system of claim 1, wherein the main member is hollow.

6. The sensor system of claim 1, wherein each of the cantilever members is hollow.

7. The sensor system of claim 1, further comprising one or more additional cameras in electronic communication with the control unit.

8. The sensor system of claim 7, wherein the additional cameras are positioned at an angle relative to the pair of stereoscopic cameras.

9. The sensor system of claim 8, wherein the angle relative to the pair of stereoscopic cameras is 30 degrees.

10. The sensor system of claim 1, wherein the control unit comprises one or more of a computer, a touchscreen monitor, and a mobile hotspot.

11. The sensor system of claim 1, further comprising a mounting assembly, comprising:
a mounting member fixedly secured to the second end of the first cantilever member and defining a hole therein;
a motor fixedly secured to the mounting member, wherein the motor is in electronic communication with the control unit and is configured to drive an axle, the axle being positioned through the hole of the mounting member;
a carriage comprising a planar member and a flange member perpendicular to the planar member, wherein the flange member is fixedly secured to the axle such that the motor is configured to rotate the carriage;
wherein the LIDAR unit is fixedly secured to the planar member of the carriage.

12. The sensor system of claim 11, wherein the motor is configured to rotate the carriage according to a cycle of 180 degrees in a first direction followed by 180 degrees in a second and opposite direction.

13. A maritime vessel that includes one or more of the sensor systems of claim 1.

14. The maritime vessel of claim 13, wherein the maritime vessel includes two of the sensor systems.

15. The maritime vessel of claim 14, wherein the control unit of each sensor system is electronically connected.

16. The maritime vessel of claim 14, wherein one of the sensor systems is mounted to a bow of the maritime vessel and another of the sensor systems is mounted to a stern of the maritime vessel.

17. The maritime vessel of claim 13, wherein the maritime vessel is a speed boat.

18. The maritime vessel of claim 13, wherein the maritime vessel is a cargo vessel.

19. A method for operating a sensor system, comprising:
providing a data collection mast, comprising:
a base;
a support member fixedly secured to the base and defining an axial through bore therein;
a main member having a first end fixedly secured within the through bore of the support member, a second end opposite the first end, wherein the main member further includes a lower portion, an intermediate portion, and an upper portion sequentially located between the first end and the second end;
a top plate fixedly secured to the second end of the main member;
a first enclosure fixedly secured to and surrounding the lower portion of the main member;
a second enclosure fixedly secured to and surrounding the intermediate portion of the main member;
a first cantilever member having a first end and a second end, the first end of the first cantilever member fixedly secured to the intermediate portion of the main member, and the second end of the first cantilever member located at a position radially beyond the second enclosure from the main member, such that the first cantilever member is perpendicular to the main member; and
a second cantilever member having a first end and a second end, the first end of the second cantilever member fixedly secured to the upper portion of the main member, and the second end of the second cantilever member at a position radially outward from the main member and axially above the top plate;
collecting environmental image data with a pair of stereoscopic cameras disposed on the intermediate portion of the main member, wherein the second enclosure includes a pair of apertures and the pair of stereoscopic cameras, and the pair of stereoscopic cameras align with the pair of apertures;
collecting environmental radar data with a radar system disposed on the top plate;
collecting orientation data with a compass disposed on the second end of the second cantilever member;
collecting 3-D image data from a LIDAR unit disposed on the second end of the first cantilever member; and
transmitting the environmental image data, the environmental radar data, the orientation data, and the 3-D image data to a control unit fixedly secured to the lower portion of the main member and located within the first enclosure, wherein the control unit is in electronic communication with the pair of stereoscopic cameras, the radar system, the compass, and the LIDAR unit.

20. The method of claim 19, further comprising:

operating, via the control unit, a maritime vessel based on the environmental image data, the environmental radar data, the orientation data, and the 3-D image data.

* * * * *